US008768496B2

(12) United States Patent
Katz et al.

(10) Patent No.: US 8,768,496 B2
(45) Date of Patent: Jul. 1, 2014

(54) METHOD FOR SELECTING PERCEPTUALLY OPTIMAL HRTF FILTERS IN A DATABASE ACCORDING TO MORPHOLOGICAL PARAMETERS

(75) Inventors: Brian Katz, Paris (FR); David Schönstein, Camperdown (AU)

(73) Assignees: Arkamys, Paris (FR); Centre National de la Recherche Scientifique, Paris (FR)

( * ) Notice: Subject to any disclaimer, the term of this patent is extended or adjusted under 35 U.S.C. 154(b) by 92 days.

(21) Appl. No.: 13/640,729

(22) PCT Filed: Apr. 12, 2011

(86) PCT No.: PCT/FR2011/050840

§ 371 (c)(1), (2), (4) Date: Oct. 12, 2012

(87) PCT Pub. No.: WO2011/128583

PCT Pub. Date: Oct. 20, 2011

(65) Prior Publication Data

US 2013/0046790 A1 Feb. 21, 2013

(30) Foreign Application Priority Data

Apr. 12, 2010 (FR) ..................................... 10 52767

(51) Int. Cl.
*G06F 17/00* (2006.01)
*H04R 5/02* (2006.01)

(52) U.S. Cl.
USPC .................. 700/94; 381/309; 381/26; 381/17

(58) Field of Classification Search
CPC ............ H04S 2420/00; H04S 2420/01; H04S 2400/01; H04S 3/00; H04S 3/002; H04S 3/004; H04S 1/002; H04S 1/005; H04S 7/303; H04S 7/304; H04S 7/306; H04S 5/033; H04S 5/04; H04R 5/027; G06F 3/16; G06F 3/162; G06F 3/165; G06F 3/167
USPC ......... 381/1, 17–21, 26, 74, 309, 310; 700/94
See application file for complete search history.

(56) References Cited

U.S. PATENT DOCUMENTS

| | | | |
|---|---|---|---|
| 5,742,689 | A | 4/1998 | Tucker et al. |
| 6,996,244 | B1 | 2/2006 | Slaney et al. |

(Continued)

FOREIGN PATENT DOCUMENTS

| | | | |
|---|---|---|---|
| WO | WO 01/54453 A1 | 7/2001 |
| WO | WO 2007/048900 A1 | 5/2007 |

OTHER PUBLICATIONS

Moller et al., Binaural technique: do we need individual recordings?, *J. Audio Eng. Soc.*, vol. 44, No. 6, pp. 451-469, Jun. 1996.

*Primary Examiner* — Xu Mei
(74) *Attorney, Agent, or Firm* — IM IP Law PLLC; C. Andrew Im

(57) ABSTRACT

A method for selecting a perceptually optimal HRTF in a database according to morphological parameters. A first database includes the HRTFs of subjects M, a second database includes the morphological parameters of the subjects, and a third database corresponds to a perceptual classification of the HRTFs. The N most relevant morphological parameters are sorted by correlating the second and third databases. A multidimensional space is created, which optimizes the spatial separation between the HRTFs according to the classification thereof in the third database to obtain an optimized space. An optimized projection model MPO is calculated for correlating K optimal morphological parameters with the corresponding position of the HRTF filters in the optimized space. For any user whose HRTF is not included in the database, at least one HRTF can be selected from the database BD1 according to the parameters K of the user and the optimized projection model MPO.

11 Claims, 3 Drawing Sheets

(56) References Cited

U.S. PATENT DOCUMENTS

| | | | | |
|---|---|---|---|---|
| 7,840,019 | B2 * | 11/2010 | Slaney et al. | 381/303 |
| 7,921,016 | B2 * | 4/2011 | Ou | 704/266 |
| 8,489,371 | B2 * | 7/2013 | Guillon et al. | 703/6 |
| 2008/0137870 | A1 * | 6/2008 | Nicol et al. | 381/17 |
| 2008/0306720 | A1 | 12/2008 | Nicol et al. | |
| 2009/0034772 | A1 * | 2/2009 | Iida et al. | 381/356 |

* cited by examiner

METHOD FOR SELECTING PERCEPTUALLY OPTIMAL HRTF FILTERS IN A DATABASE ACCORDING TO MORPHOLOGICAL PARAMETERS

RELATED APPLICATIONS

This application is a §371 application from PCT/FR2011/050840 filed Apr. 12, 2011, which claims priority from French Patent Application No. 10 52767 filed April 12, each of which is incorporated herein by reference in its entirety.

TECHNICAL FILED OF THE INVENTION

The invention relates to a method for selecting HRTF filters in a database according to morphological parameters. The invention notably aims to ensure reliability in the HRTFs selected for a particular user.

The invention has a particularly advantageous application in the domain of binaural synthesis applications, which refers to the generation of spatialized sound for both ears. The invention therefore is used, for example, for teleconferencing, hearing aids, assistive listening devices for the visually impaired, 3D audio/video games, mobile phones, mobile audio players, virtual reality audio, and augmented reality.

BACKGROUND OF THE INVENTION

Humans have the ability to decode directional information from an incident sound with an acoustic transfer function. The head, the outer ears, and the body of a listener transform the spectral information from a sound in the space by means of what is called the Head-Related Transfer Function (HRTF), which allows us to perceive our acoustic environment based on the position, distance, etc. of sound sources and therefore to locate them.

HRTF filters consist of a pair of filters (left and right) that describe the filtering of a sound source at a given position by the body. It is commonly accepted that a set of about 200 positions is adequate for describing all of the directions in the space a person perceives. These HRTF filters essentially depend on the morphology of the ear (size, dimensions of the internal cavities, etc.) and other physical parameters of the person's body.

In the remainder of this document, the term "HRTF" represents the filters for all of the HRTF-type positions for a given subject.

Using the HRTFs in an audio application that are the closest possible to the listener's HRTF filters can achieve high-quality rendering. Several studies in the literature demonstrate the benefit of so-called individualized HRTFs (for example, see the Moller et al. article "Binaural technique: do we need individual recordings?" published in the *Journal of the Audio Engineering Society:* 44, 451-469), especially in terms of accuracy in location tests.

HRTF filters can be obtained by taking measurements with microphones in the listener's ear, or even by digital simulation. Despite the quality of these methods, they are still very tedious, very expensive, and inadaptable to consumer applications.

Moreover, a known method described in the document WO-01/54453, provides for selecting, within a database, the closest HRTFs to those of the user. However, unlike the invention, such a method that is effective in terms of statistics does not use the perceptual quality of the selection of HRTFs as a validation criterion and therefore does not select the best possible HRTFs.

OBJECT AND SUMMARY OF THE INVENTION

The novelty of the invention therefore lies in the fact that a perceptual assessment criterion based on a perceptual listening test is used to create an optimized HRTF multidimensional space and to select the most relevant morphological parameters. The invention also allows a predictive model to be developed that establishes a perceptually relevant correlation between the space and the morphological parameters.

For any user, the invention will allow the most appropriate HRTF included in a database to be selected using only measurements of morphological parameters.

The selected HRTF filter is strongly correlated with the spatial perception (and not just a mathematical calculation), which provides for great comfort and sound quality.

The invention therefore relates to a method for selecting a perceptually optimal HRTF in a database according to morphological parameters using:

- a first database that includes the HRTFs of a plurality of subjects,
- a second database that includes the morphological parameters of the subjects from the first database, wherein the method further uses

- a third database that corresponds to a perceptual classification of the HRTFs from the first database with respect to a judgment by the subjects performed using a listening test that corresponds to the different HRTFs from the first database, and wherein the method comprises the following steps:

- sort, among all of the morphological parameters from the second database, the N most relevant morphological parameters by correlating the second and third databases,
- create a multidimensional space whose dimensions are the result of a combination of HRTF components,
- modify the rules for combining components in order to optimize the spatial separation between the HRTFs according to the classification thereof in the third database so as to obtain an optimized multidimensional space,
- calculate an optimized projection model suitable for correlating K sorted morphological parameters extracted from the second database with the corresponding position of the HRTFs in the optimized space, the K extracted parameters optimizing the projection model,
- measure the K morphological parameters for a given user that do not have an HRTF in the first database,
- apply the previously calculated optimized projection model to the extracted morphological parameters in order to obtain the user's position in the optimized space,
- select at least one HRTF in the vicinity of the user's projection position in the optimized space.

According to an embodiment, in order to perform the perceptual classification, the subject has at least two choices (good or bad) in his judgment on at least one listening criterion for a sound corresponding to an HRTF.

According to an embodiment, the listening criterion is selected, for example, from among the accuracy of the defined sound path, the overall spatial quality, the front rendering quality (for sound objects that are located in front), and the separation of front/rear sources (ability to identify whether a sound object is located in front of or behind the listener).

According to an embodiment, to develop the third database:

a sound signal is presented on which each of the HRTFs from the first database (including the subject's own HRTF) is applied to each subject, the sound signal used for the test being a broadband white noise with a short duration, such as 0.23 seconds, obtained by a Hanning window, the sound signal having been rendered at point positions along both trajectories presented in sequence:

a circle in the horizontal plane (elevation=0 degrees), in particular by 30 degrees increments, the trajectory starting at 0 degrees azimuth and 0 degrees elevation, the path being repeated one time, an arc in the median plane (azimuth=0 degrees) from elevation −45 degrees to the front up to −45 degrees to the back, through an elevation of 90 degrees, in particular by 15 degrees increments, the sound path starting to the front at elevation −45 degrees, and continuing to the elevation to the back and then returning along the same path to the starting position.

According to an embodiment, in order to make the correlation between the second and the third database to obtain the sorted morphological parameters, the morphological data is normalized by creating sub-databases by dividing the morphological values from the second database by the morphological values of each subject from the second database, each sub-database is associated with the classification from the third database for the corresponding subject, the support vector machine (SVM) method is applied in order to obtain the morphological parameters ranked from highest to lowest, this ranking being a function of the separation quality of each HRTF parameter according to the categorization in the third database.

According to an embodiment, in order to create the optimized multidimensional space, in a first step, the HRTFs are converted into Directional Transfer Functions (DTFs) that contain only the portion of the HRTFs that have a directional dependence, in a second step, the DTFs are smoothed, in a third step, the DTFs are preprocessed, in a fourth step, the data dimensionality is transformed in order to reduce or increase the number of dimensions, depending on the data used, which is the result of the previous step, in the option of reducing the data dimensionality, a principal component analysis (PCA) is performed on the processed DTFs in order to obtain a new data matrix (the scores) that represent the original data projected onto new axes (the principal components), and a multidimensional space is created from each column of the score matrix, representing a dimension of the multidimensional space, or in the option of increasing the data dimensionality, multidimensional scaling (MDS) is used to create the multidimensional space, in a fifth step, the optimization level is evaluated by the significance level of the spatial separation between the classifications from the third database, the previous steps are repeated with different preprocessing parameters and/or by limiting the number of dimensions in the created multidimensional space, and the space with the most optimal optimization level is kept.

According to an embodiment, a critical band smoothing of the DTFs is performed according to the limits of the frequency resolution of the auditory system.

According to an embodiment, the pre-processing is performed using one of the following methods: frequency filtering, delimiting frequency ranges, extracting frequency peaks and valleys, or calculating a frequency alignment factor.

According to an embodiment, the optimization level is evaluated:

by the significance level of the spatial separation between the classifications in the third database, the significance level being, for example, evaluated by using the ANOVA test, or by calculating the percentage of HRTFs ranked in the highest category among the ten closest HRTFs in the space EM and by comparing this percentage with the overall percentage of HRTFs ranked in the high category in the third database for each subject using, for example, the Student test.

According to an embodiment, in order to calculate a projection model for correlating the N morphological parameters extracted from the second database with the corresponding position of the HRTFs in the optimized space:

in a first step, a projection model is calculated by multiple linear regression between the optimized multidimensional space and the ranked morphological parameters for the purpose of finding a position in the optimized multidimensional space from the ranked morphological parameters from the second database, in a second step, the quality level of the projection model is evaluated, in a third step, the number of ranked morphological parameters is reduced to the first K ranked morphological parameters and the calculations of the model are repeated from the first and second steps of measure of the quality of each K, from K equals 1 to K equals N, this calculation being repeated for each subject, removing their data from the first database and the second database and the optimum K for which the quality level is the highest is kept.

According to an embodiment, in order to select at least one HRTF in the vicinity of the user's projection position in the optimized multidimensional space, the HRTF that is closest to the projection position in the optimized multidimensional space is chosen.

BRIEF DESCRIPTION OF THE DRAWINGS

The invention will be better understood upon reading the following description and studying the figures that accompany it. These figures are provided for illustrative purposes only and are not limiting to the invention. They show.

Identical, similar, or analogous elements maintain the same reference number from one figure to the next.

DETAILED DESCRIPTION OF THE EMBODIMENTS

Creation of the Databases

For a plurality of subjects microphones are positioned in the subject's ears, and sound sources are scattered over various points in the space in order to determine the HRTFs for each subject. The morphological parameters are also measured for each subject. A first database BD1 contains the HRTFs, and a second database BD2 contains the morphological parameters for the associated subjects.

In our example, the HRTFs stored in the first database BD1 come from the public database from the LISTEN project. The data from the first M subjects in this database are used (in one example M=45). The LISTEN HRTF measurements were taken at positions in the space that correspond to elevation angles ranging from −45 degrees to 90 degrees by 15 degrees increments and azimuth angles starting at 0 degrees by 15 degrees increments. The azimuth increments were gradually increased for the elevation angles over 45 degrees in order to evenly sample the space, for a total of 187 positions.

Figure 4:
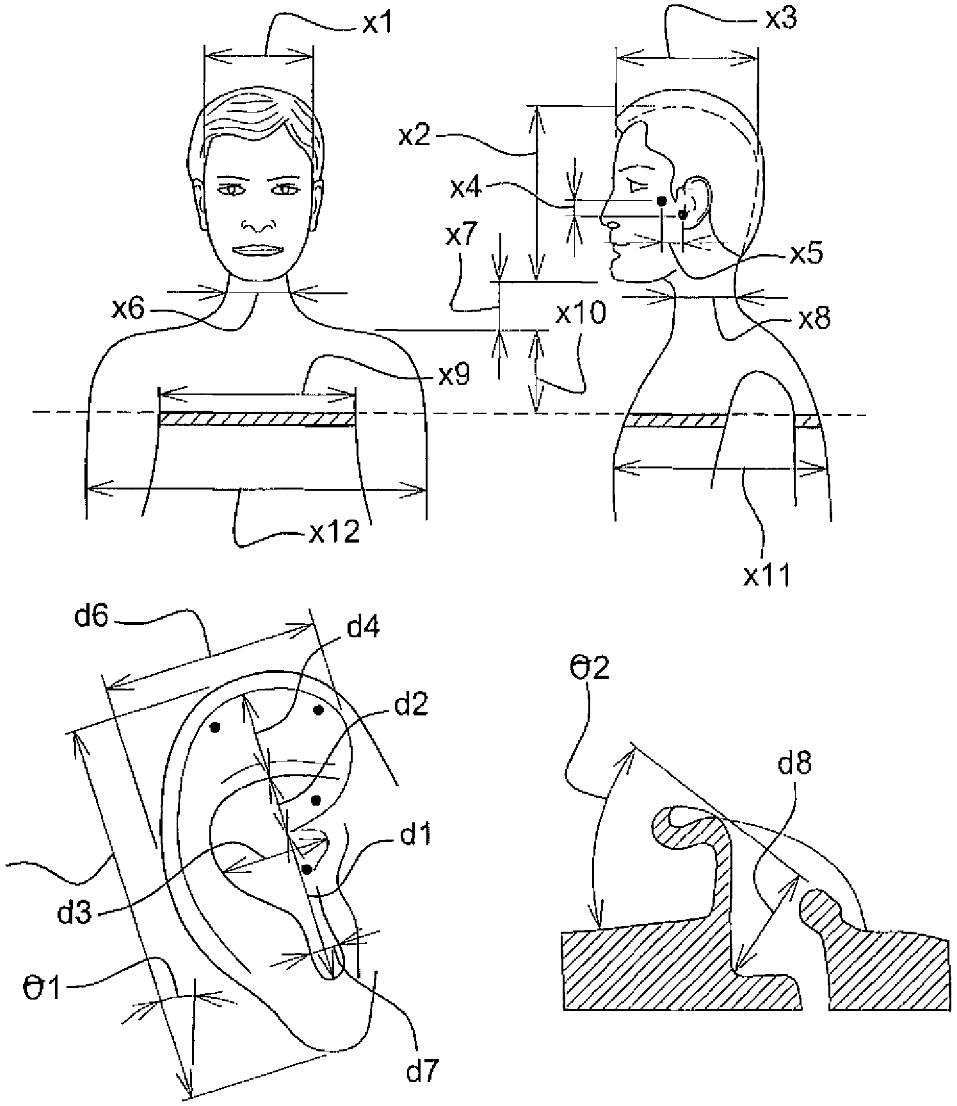
FIG. 4: A schematic representation from the article on the CIPIC database showing the various morphological parameters used in that database.

As shown in FIG. 4, the second database BD2 includes the following morphological parameters for each subject:

x1: head width;
x2: head height;
x3: head depth;
x4: pinna offset down;
x5: pinna offset back;
x6: neck width;
x7: neck height;
x8: neck depth;
x9: torso top width;
x0: torso top height;
x11: torso top depth;
x12: shoulder width;
x13: head circumference;
x14: shoulder circumference;
d1: cavum concha height;
d2: cymba concha height;
d3: cavum concha width;
d4: fossa height;
d5: pinna height;
d6: pinna width;
d7: intertragal incisure width;
d8: cavum concha depth;
Θ1: pinna rotation angle;
Θ2: pinna angle parameter.

These morphological parameters, which are stored in the second database BD2, correspond to the HRTFs of the subjects.

Moreover, in a step E1, a third database BD3 is created containing the perceptual evaluation results from the listening test. For each subject, a test signal on which HRTFs from the database BD1 are applied is emitted.

In one example, the sound signal used for the test is a broadband white noise with a short duration, such as 0.23 seconds, obtained by a Hanning window, the sound signal having been rendered at point positions along both trajectories presented in sequence:

a circle in the horizontal plane (elevation=0 degrees), in particular by 30 degrees increments, the trajectory starting at 0 degrees azimuth and 0 degrees elevation, the path being repeated one time, an arc in the median plane (azimuth=0 degrees) from elevation −45 degrees to the front up to −45 degrees to the back, through an elevation of 90 degrees, in particular by 15 degrees increments, the sound path starting to the front at elevation −45 degrees, and continuing to the elevation to the back and then returning along the same path to the starting position.

Each subject has classified each of the HRTFs into one of the following three categories: excellent, fair, or poor. Excellent is considered to be the highest judgment category. These judgments are based on at least one criterion for listening to a sound corresponding to an HRTF. The criterion may selected from one of the following examples: the accuracy of the previously defined path, the overall spatial quality, the front rendering quality (for sound object that are located in front), and the separation of front/rear sources (ability to identify whether a sound object is located in front of or behind the listener).

Figure 3:
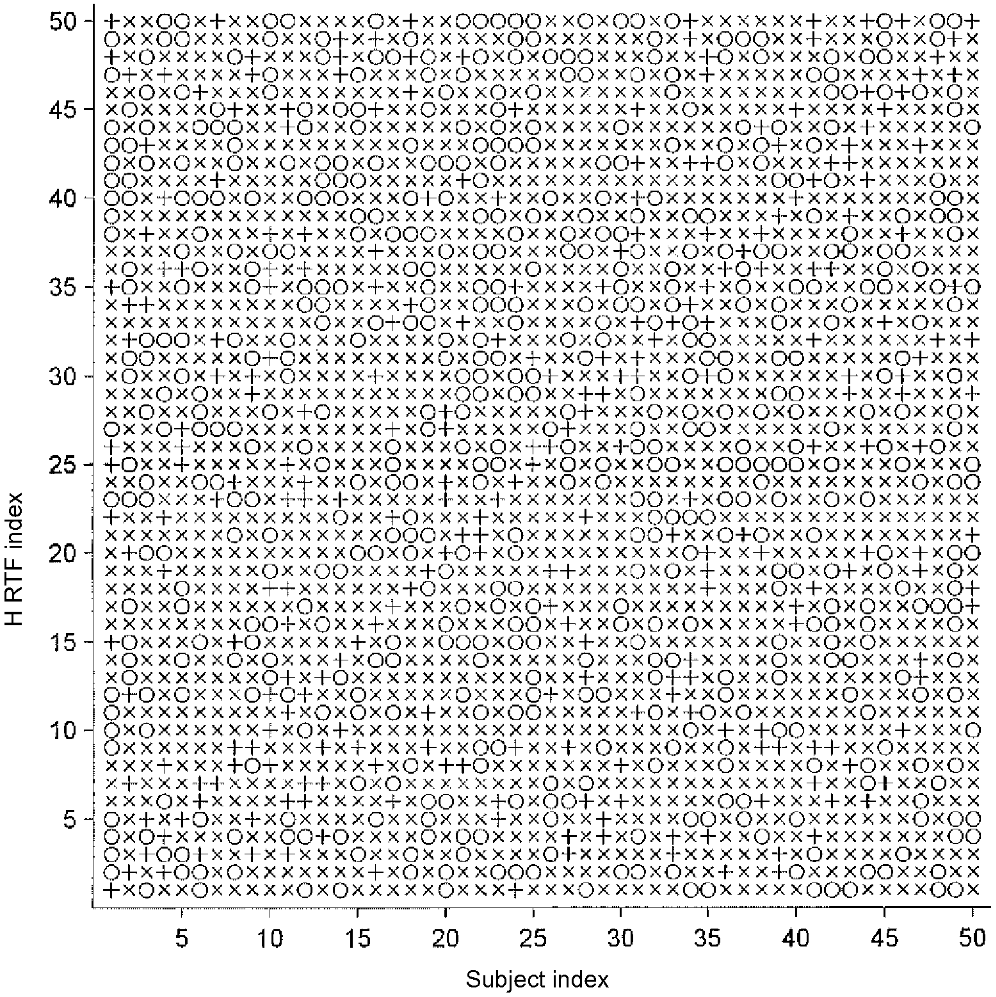
FIG. 3: A graphic showing the subjects along the horizontal axis and the ranked HRTFs in the third database along the vertical axis.

FIG. 3 shows the types of results that are obtained with this type of listening test for all subjects ("+" is excellent, "o" is fair, and "x" is poor). The subjects are shown on the horizontal axis, and the ranked HRTFs are shown on the vertical axis.

Selection of Important Morphological Parameters

Figure 1:
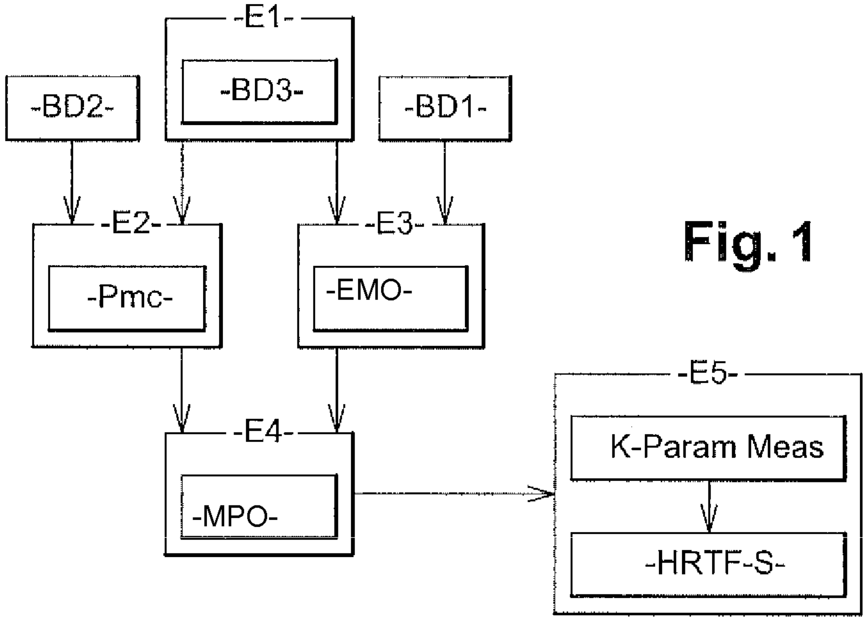
FIG. 1: A block diagram of the function blocks of the method according to the invention.
Figure 2:
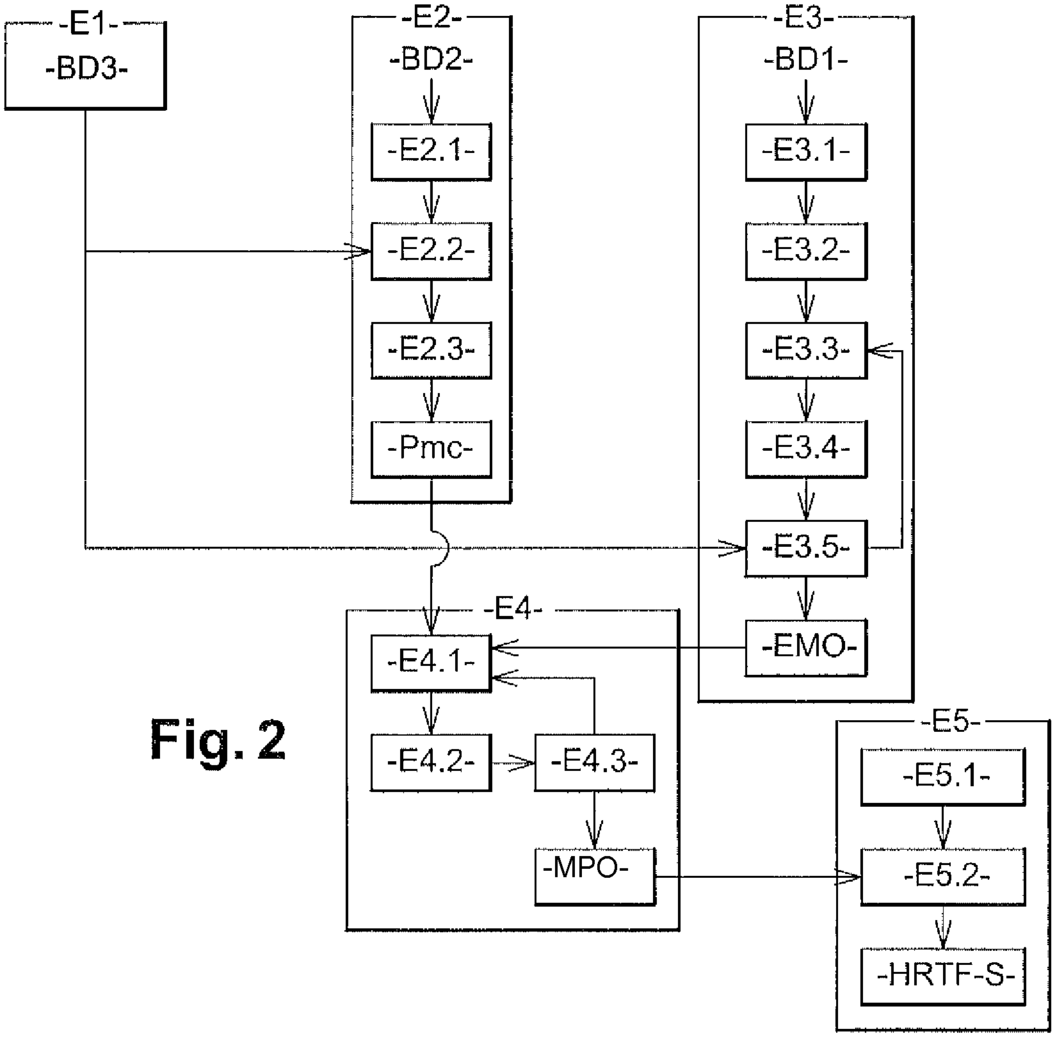
FIG. 2: A block diagram of an example of a detailed implementation of one embodiment of the invention.

As shown in FIGS. 1 and 2, in a step E2, in order to select the important morphological parameters, the second database BD2 is correlated with the third database BD3.

For that purpose, in a sub-step E2.1, the morphological data is normalized by creating sub-databases BD2*i* (i ranging from 1 to M, which is the number of subjects in the databases) by dividing the morphological values from the second database BD2 by the morphological values of each subject in the second database BD2[*i*]. With this normalization, the values represent the percentage of one subject's morphological parameter relative to another's.

Each sub-database BD2*i* is associated in a sub-step E2.2 with the classification in the third database of the corresponding subject BD3[*i*].

Then, in a sub-step E2.3, a feature selection method is applied in order to obtain the morphological parameters ranked from highest to lowest Pmc. This classification is based on their ability to separate the HRTFs according to their classification in the third database BD3.

The chosen method is a support vector machine (SVM) method. This method is based on the construction of a set of hyper-planes in a high-dimension space in order to classify the normalized data. With this method, the parameters have therefore been ranked from highest to lowest.

Two variables control the classification with SVM. The complexity value C, which controls the classification error tolerance in the analysis, introduces a penalty function. A null value of C indicates that the penalty function is not being taken into account, and a high value of C (endlessly increasing C) indicates that the penalty function is dominant. The epsilon value $\epsilon$ is the insensitivity value that sets the penalty function to zero if the data to be classified is at a distance of less than $\epsilon$ from the hyper-plane. The classification of the morphological parameters changes according to the different values of C and $\epsilon$. Using this method where C=1 and $\epsilon=1\times10^{-25}$, the first ten highest elements of the Pmc, ranked from highest to lowest, in our example, are: x11, x2, x8, d5, x3, d4, x12, d2, d1, and x6.

Creation of an Optimized Multidimensional Space

In a step E3, a multidimensional space EM is created whose dimensions result from a combination of components from the HRTF filters.

For that purpose, in a first step E3.1, the HRTFs are converted into what are called Directional Transfer Functions (DTFs) that contain only the portion of the HRTFs that have a directional dependence.

In a step E3.2, a critical band smoothing of the DTFs is performed according to the limits of the frequency resolution of the auditory system.

In a step E3.3, the DTFs are preprocessed using a method selected from among the following: frequency filtering, delimiting frequency ranges, extracting frequency peaks and valleys, or calculating a frequency alignment factor.

In a step E3.4, the data dimensionality is transformed in order to reduce or increase the number of dimensions, depending on the data used, which is the result of the step E3.3.

To reduce the data dimensionality, a principal component analysis (PCA) is performed on the processed DTFs in order to obtain a new data matrix (the scores) that represent the original data projected onto new axes (the principal components), and a space EM is created from each column of the score matrix, representing a dimension of the space EM.

To increase the data dimensionality, a multidimensional scaling (MDS) analysis is used on the processed DTFs, resulting in the space EM.

In a step E3.5, the optimization level is evaluated. In a first example, the optimization level is evaluated by the significance level of the spatial separation between the classifications from the third database BD3. In one example, the significant level is evaluated using the ANOVA test to check whether the value distribution averages were statistically different for each different number of dimensions.

In a second example, the percentage of HRTFs ranked in the highest category among the ten closest HRTFs in the space EM is calculated and this percentage is compared, using the Student test for example, with the overall percentage of HRTFs ranked in the high category in the third database for each subject.

The previous steps are repeated with different preprocessing parameters and/or by limiting the number of dimensions in the created space.

The space with the most optimal optimization level is kept. This space is the one in our examples with the highest significance level or the one in the second example with the number of ranked HRTFs in the highest category for the closest ten HRTFs is maximized.

Such kept space is the optimized multidimensional space EMO.

The purpose of the step E3.5 is to optimize the spatial separation between the HRTFs according to their classification in the third database BD3 in order to obtain an optimized space. Indeed, in the space EMO, for a subject at a given position, the HRTFs located in the area near this position will be considered as good for the subject, while the HRTFs that are distant from this position will be considered as bad.

In other words, the rules for combining HRTF components are changed in order to maximize the correlation between the spatial separation between the HRTFs and the classification of HRTFs in the third database BD3.

Development of a Projection Model

In a step E4, a projection model is calculated for correlating the N morphological parameters extracted from the second database BD2 with the position of the corresponding HRTFs in the optimized space EMO.

For that purpose, in a step E4.1, a projection model is calculated by multiple linear regressions between EMO and Pmc using the second database BD2 for the purpose of finding a position in the space EMO based on the ranked morphological parameters Pmc.

In a step E4.2, the quality level of the projection model is evaluated. This quality level is calculated using the same methods as were used in E3.5.

In a step E4.3, Pmc is reduced to the first K ranked morphological parameters, and the calculations of the model are repeated from the step E4.1 and the step E4.2 of measure of the quality for each K from K equals 1 to K equals N. Preferably, this calculation is repeated for each subject by removing the data of the subject from the first database BD1 and from the second database BD2 in the step E3.

The optimum K for which the quality level is the highest is kept. Therefore, the K extracted parameters maximize the correlation between the optimized multidimensional space EMO and the space produced by the projection model.

This provides an optimized projection model MPO.

Implementation of the Method

In a step E5, at least one HRTF is selected in the database BD1 for any user that does not have a HRTF in the database.

For this purpose, in a sub-step E5.1, the user measures the previously identified K morphological parameters. For this purpose, the user takes a photo of his ear in a determined position, the K parameters being extracted by an image processing method.

In a step E5.2, the K parameters are injected as input from the previously calculated projection model MPO into the extracted morphological parameters in order to obtain the user's position in the optimized space EMO.

At least one HRTF (marked HRTF-S) is then selected in the vicinity of the user's projection position in the optimized space. In one example, the HRTF that is closest to the projection position is chosen.

The invention claimed is:

1. A method for selecting a perceptually optimal head-related transfer function (HRTF) in a database according to morphological parameters, comprising the steps of:

sorting, among all of the morphological parameters from a second database, the N most relevant morphological parameters by correlating the second database and a third database, wherein a first database comprises the HRTFs of a plurality of subjects, a second database comprises the morphological parameters of the subjects from the first database, and a third database corresponds to a perceptual classification of the HRTFs from the first database with respect to a judgment by the subjects performed using a listening test corresponding to the different HRTFs from the first database;

generating a multidimensional space whose dimensions result from a combination of HRTF components;

modifying rules for combining components to maximize a correlation between a spatial separation between the HRTFs and the classification of the HRTFs in the third database to obtain an optimized multidimensional space;

calculating an optimized projection model for correlating K sorted morphological parameters extracted from the second database with a corresponding position of the HRTFs in the optimized multidimensional space, the K extracted parameters maximizing the correlation between the optimized multidimensional space and a space produced by the optimized projection model;

measuring the K morphological parameters for a user not having an HRTF in the first database;

applying the previously calculated optimized projection model to extracted morphological parameters to obtain the user's projected position in the optimized multidimensional space; and selecting at least one HRTF in a vicinity of the user's projection position in the optimized multidimensional space.

2. The method of claim 1, further comprising the step of performing the perceptual classification where the subject has at least two choices (good or bad) with respect to the judgment on at least one listening criterion for a sound corresponding to an HRTF.

3. The method of claim 2, further comprising the step of selecting the listening criterion from among an accuracy of a defined sound path, an overall spatial quality, a front rendering quality for sound objects located in front and a separation of front/rear sources to identify whether a sound object is located in front of or behind a listener.

4. The method of claim 1, further comprising the step of developing the third database by:

presenting a sound signal on which each of the HRTFs from the first database is applied to each subject, including the HRTF of said each subject, the sound signal being a broadband white noise with a short duration obtained by a Hanning window; and rendering the sound signal at point positions along both trajectories presented in a sequence:

a circle in a horizontal plane, with elevation=0 degrees, in 30 degrees increments, the trajectory starting at 0 degrees azimuth and 0 degrees elevation, a path being repeated one time;

an arc in a median plane, with azimuth=0 degrees, from an elevation of −45 degrees to a front, up to −45 degrees to the back, through an elevation of 90 degrees, in 15 degrees increments; and the sound path starting to the front at elevation −45 degrees, and continuing to the elevation to the back and then returning along the same path to the starting position.

5. The method of claim 1, further comprising the step of performing a correlation between the second database and the third database to obtain the sorted morphological parameters by:

generating sub-databases by dividing morphological values from the second database by morphological values of each subject from the second database to normalize a morphological data;

associating each sub-database with the classification from the third database for a corresponding subject;

applying a support vector machine method to obtain the morphological parameters ranked from highest to lowest as a function of a separation quality of each HRTF parameter according to a categorization in the third database.

6. The method of claim 5, further comprising the step of generating the optimized multidimensional space by:

converting the HRTFs into Directional Transfer Functions (DTFs) that contain only the portion of the HRTFs that have a directional dependence;

smoothing the DTFs;

pre-processing the DTFs;

transforming a data dimensionality to reduce or increase a number of dimensions, depending on the data used, as a result of the preprocessing step; and when the data dimensionality is reduced:

performing a principal component analysis on the processed DTFs to obtain a score matrix representing an original data projected onto new axes; and generating a multidimensional space from each column of the score matrix, representing a dimension of the multidimensional space; or where the data dimensionality is increased:

generating the multidimensional space using multidimensional scaling;

evaluating an optimization level by a significance level of the spatial separation between the classifications from the third database;

repeating the steps of generating and evaluating with at least one of the following: different preprocessing parameters or by limiting the number of dimensions in the generated multidimensional space; and keeping the multidimensional space with the most optimal optimization level.

7. The method of claim 6, further comprising the step of performing a critical band smoothing of the DTFs according to the limits of a frequency resolution of an auditory system.

8. The method of claim 6, wherein the pre-processing step utilizes one of the following methods: frequency filtering, delimiting frequency ranges, extracting frequency peaks and valleys, or calculating a frequency alignment factor.

9. The method of claim 6, further comprising the step evaluating the optimization level by:

the significance level of the spatial separation between the classifications in the third database, the significance level evaluated using an ANOVA test; or calculating a percentage of HRTFs ranked in a highest category among ten closest HRTFs in the multidimensional space and comparing the percentage with an overall percentage of HRTFs ranked in the highest category in the third database for each subject using a student test.

10. The method of claim 5, wherein to calculate a projection model for correlating the N morphological parameters extracted from the second database with the corresponding position of the HRTFs in the optimized space, the method further comprises the steps of:

calculating a projection model by multiple linear regressions between the optimized multidimensional space and the ranked morphological parameters to determine a position in the optimized multidimensional space based on the ranked morphological parameters from the second database;

evaluating a quality level of the projection model;

reducing the ranked morphological parameters to first K ranked morphological parameters;

repeating the steps of calculating the projection model and evaluating the quality level for each K, where K=1 to N, and for each subject, and removing said each subject's data from the first database and the second database; and keeping an optimum K for which the quality level is the highest.

11. The method of claim 1, further comprising the step of selecting the HRTF that is closest to user's projection position in the optimized multidimensional space to select at least one HRTF in the vicinity of the user's projection position in the optimized multidimensional space.

* * * * *